United States Patent
Pudukoli Subrahmanya et al.

(10) Patent No.: US 10,959,131 B2
(45) Date of Patent: Mar. 23, 2021

(54) DYNAMIC PRIORITIZATION OF ROAM EVENTS BASED ON LATENCY

(71) Applicant: Cisco Technology, Inc., San Jose, CA (US)

(72) Inventors: Udaya Shankara Pudukoli Subrahmanya, Bengaluru (IN); Shiva Prasad Maheshuni, Bangalore (IN); Girish K. Kv, Bangalore (IN); Santosh Ramrao Patil, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 16/299,082

(22) Filed: Mar. 11, 2019

(65) Prior Publication Data

US 2020/0296632 A1 Sep. 17, 2020

(51) Int. Cl.
| | |
|---|---|
| *H04W 36/00* | (2009.01) |
| *H04L 12/743* | (2013.01) |
| *H04W 36/24* | (2009.01) |
| *H04W 80/02* | (2009.01) |
| *H04W 80/10* | (2009.01) |

(52) U.S. Cl.
CPC ..... *H04W 36/0011* (2013.01); *H04L 45/7453* (2013.01); *H04W 36/245* (2013.01); *H04W 80/02* (2013.01); *H04W 80/10* (2013.01)

(58) Field of Classification Search
None
See application file for complete search history.

(56) References Cited

U.S. PATENT DOCUMENTS

| | | | |
|---|---|---|---|
| 6,621,829 B1 | 9/2003 | Achilles et al. | |
| 7,958,260 B2 | 6/2011 | Cloonan et al. | |
| 8,184,540 B1 | 5/2012 | Perla et al. | |
| 8,391,870 B1 * | 3/2013 | Singh ............. | H04W 36/00837 455/436 |
| 8,612,612 B1 | 12/2013 | Dukes et al. | |
| 8,630,294 B1 | 1/2014 | Keen et al. | |
| 8,780,722 B2 | 7/2014 | Masputra et al. | |
| 9,037,729 B2 | 5/2015 | Larkin | |
| 9,065,779 B2 | 6/2015 | Stanwood et al. | |

(Continued)

OTHER PUBLICATIONS

PCT Notification of the Transmittal of the International Search Report and the Written Opinion of the International Searching Authority, or the Declaration for Application No. PCT/US2020/020823 dated Jun. 8, 2020.

(Continued)

*Primary Examiner* — Otis L Thompson, Jr.
(74) *Attorney, Agent, or Firm* — Patterson + Sheridan, LLP

(57) ABSTRACT

Techniques for dynamic prioritization of network session are provided. A first packet belonging to a first session is received at a data plane of a network. Upon determining that the first packet is part of a first roam event, a first bloom filter bank is searched to determine a priority associated with the first session, where the priority is based at least in part on a historical latency experienced during the first roam event. A first queue of a plurality of queues is selected based on the determined priority, and the first packet is added to the first queue, where packets in the plurality of queues are transmitted to a control plane of the network based on a respective priority assigned to each of the plurality of queues.

20 Claims, 9 Drawing Sheets

(56) References Cited

U.S. PATENT DOCUMENTS

| | | | |
|---|---|---|---|
| 9,769,645 B2 | 9/2017 | Patil et al. | |
| 10,515,049 B1* | 12/2019 | Fleming | G06F 15/7892 |
| 2014/0032714 A1* | 1/2014 | Liu | H04L 67/18 |
| | | | 709/217 |
| 2015/0058441 A1 | 2/2015 | Weizman et al. | |
| 2015/0095404 A1* | 4/2015 | Perlman | H04L 67/1034 |
| | | | 709/203 |
| 2018/0206166 A1* | 7/2018 | Ganesan | H04W 36/18 |
| 2018/0288726 A1* | 10/2018 | Azgin | H04L 43/0864 |
| 2019/0238627 A1* | 8/2019 | Shiell | H04L 67/1002 |
| 2019/0273583 A1* | 9/2019 | Ugurlu | H04W 36/04 |
| 2020/0074565 A1* | 3/2020 | Dotter | G06Q 40/025 |

OTHER PUBLICATIONS

Atta-Ul-Qudoos et al: 11 Pre-Emptive Channel Assignment Scheme with Fair Queue Scheduling in Evolving Mobile Networks Modeling &Simulation, 2008. AICMS 08. Second Asia International Conference On, IEEE, Piscataway, NJ' USA, May 13, 2008, pp. 185-190.
Michale Luke et al: 11 Stochastic Pre-classification for SDN Data Plane Matching 11 2014 IEEE 22nd International Conference on Network Protocols, IEEE, Oct. 21, 2014 (Oct. 21, 2014), pp. 596-602.

\* cited by examiner

DYNAMIC PRIORITIZATION OF ROAM EVENTS BASED ON LATENCY

TECHNICAL FIELD

Embodiments presented in this disclosure generally relate to priority of network events. More specifically, embodiments disclosed herein relate to dynamically prioritizing events based on historical latency.

BACKGROUND

As wireless devices migrate between network access points, a handoff procedure occurs to transfer the connection from the first access point to the second. This roam event must occur smoothly, or the device will see connectivity drops or delays. As devices are increasingly used for real-time (and often high-bandwidth) data, it has become ever more vital that the roam is handled quickly, or the user will perceive the interruption. For example, if a voice or video stream is interrupted for too long during the roam, a noticeable drop can occur, which reduces the quality of service provided to the user. Additionally, as new controller architectures and protocols evolve with increasing complexity and features, the overhead and delay involved in roam events has similarly increased.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
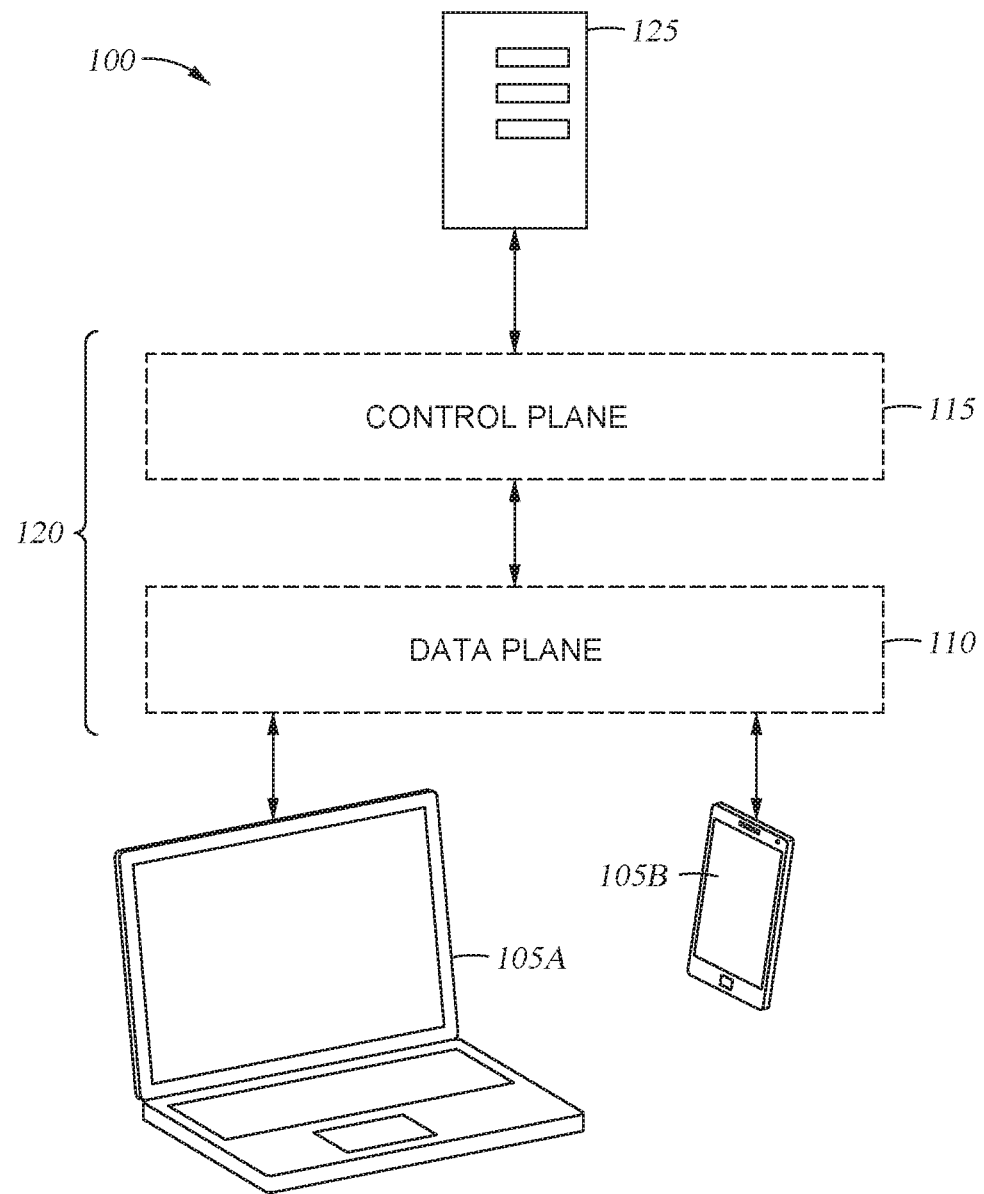
FIG. 1 illustrates an environment configured to dynamically prioritize roam events, according to one embodiment disclosed herein.

According to one embodiment presented in this disclosure, a method is provided. The method includes receiving, at a data plane of a network, a first packet belonging to a first session. Upon determining that the first packet is part of a first roam event, the method includes searching a first bloom filter bank to determine a priority associated with the first session, wherein the priority is based at least in part on a historical latency experienced during the first roam event. The method further includes selecting a first queue of a plurality of queues based on the determined priority. Finally, the method includes adding the first packet to the first queue, wherein packets in the plurality of queues are transmitted to a control plane of the network based on a respective priority assigned to each of the plurality of queues.

According to a second embodiment presented in this disclosure, a computer product is provided. The computer product includes logic encoded in a non-transitory medium, the logic executable by operation of one or more computer processors to perform an operation. The operation includes receiving, at a data plane of a network, a first packet belonging to a first session. Upon determining that the first packet is part of a first roam event, the operation includes searching a first bloom filter bank to determine a priority associated with the first session, wherein the priority is based at least in part on a historical latency experienced during the first roam event. The operation further includes selecting a first queue of a plurality of queues based on the determined priority. Finally, the operation includes adding the first packet to the first queue, wherein packets in the plurality of queues are transmitted to a control plane of the network based on a respective priority assigned to each of the plurality of queues.

According to a third embodiment presented in this disclosure, a network device is provided. The network device includes one or more computer processors, and logic encoded in a non-transitory medium. The logic is executable by operation of the one or more computer processors to perform an operation including receiving, at a data plane of a network, a first packet belonging to a first session. Upon determining that the first packet is part of a first roam event, the operation includes searching a first bloom filter bank to determine a priority associated with the first session, wherein the priority is based at least in part on a historical latency experienced during the first roam event. The operation further includes selecting a first queue of a plurality of queues based on the determined priority. Finally, the operation includes adding the first packet to the first queue, wherein packets in the plurality of queues are transmitted to a control plane of the network based on a respective priority assigned to each of the plurality of queues.

Example Embodiments

Embodiments of the present disclosure provide dynamic prioritization of network events (such as roam events) based in part on historical latency associated with the session or with the event. For example, if a voice stream is interrupted for more than sixty milliseconds, the gap becomes perceptible to the human ear. In embodiments, the latency or delay introduced by an ongoing roam event is monitored, and the priority of future transactions in the roam event is dynamically adjusted, based on comparing the current latency and the target "maximum" delay. In embodiments, one or more filters or filter banks are utilized to efficiently categorize and prioritize the traffic, as discussed below in more detail. In some embodiments, these filters are implemented (e.g., using a tree or hash table). In an embodiment, the filters are bloom filters, which can be implemented efficiently in hardware. In one embodiment, separate filter banks are configured for each interface, and the proper priority for one or more of the interfaces is learned from the base interface, as discussed in more detail below. Additionally, in some embodiments, the type of the traffic is used as a contributing factor in deciding the priority of the event. For example, in such an embodiment, voice or video streams may be afforded higher priority (or be assigned a lower target maximum delay), as compared to non-real time data traffic or traffic where a small delay or drop is not perceivable (such as file transfers, or data download while browsing a website).

In embodiments, when a mobile device roams between access points in a wireless local area network (WLAN) environment (e.g., a Wi-Fi deployment), a roam event occurs to ensure a successful handoff. In some embodiments, this roam event includes authentication of the client device and/or the user. Some such authentication techniques are relatively lightweight, requiring a relatively small number of messages, events, or transactions to be exchanged. However, many such authentication techniques (such as the 802.1X suite of protocols) involve higher levels of security, and can involve a significant number of messages or events. Additionally, although some such events occur within the WLAN system, in some embodiments, an external service must be consulted (e.g., an authentication, authorization, and accounting (AAA) server). Not only does such interactivity introduce latency across a broader network, but the latency of such a service is often beyond the control of the WLAN system.

In particular, during a roam event, latency can be introduced at various stages, including processing time or queuing delay in the client device and the access point (AP), network latency between the client device, the AP, and the controller (if separate from the AP), processing time and queuing delay at the controller, network latency between the controller and any servers with which it interacts during the roam (e.g., AAA server(s), Dynamic Host Configuration Protocol (DHCP) servers, and the like), processing time and queuing delays in the remote servers, and the like. In some embodiments (such as 802.1X PEAP slow roam events), more than eight transactions are completed with the AAA server, which alone can introduce between twenty-five and thirty milliseconds of network latency.

In some embodiments, some events or sessions are prioritized based on their historical latency (and how close to the preferred maximum delay they are). In one embodiment, this is accomplished by introducing priority queues, and transmitting higher priority flows via queues that have relatively fewer sessions assigned to it, such that the higher priority queues empty faster than relatively lower priority queues. That is, in some embodiments, the messages are taken off of the queues at an equal rate (e.g., one message from a high priority queue, followed by one from the medium queue, followed by one from the low priority queue, and repeating this cycle). In an embodiment, because fewer sessions are assigned to the higher priority queue, a given packet will have fewer packets ahead of it in the queue, as compared to a lower priority queue. Thus, in an embodiment, the messages in a higher priority queue will tend to spend less time waiting, as compared to an event in a lower priority queue which has more messages or events ahead of it. Additionally, in some embodiments, the higher priority queues are actively emptied more quickly than lower priority queues, regardless of the number of events in each. For example, in one such embodiment, two transactions or messages may be transmitted from the highest priority queue for every one message that is transmitted from the lowest priority queue.

In embodiments, sessions that have experienced higher than expected latency have their priority elevated for future transactions or messages in the event. In some embodiments, session that have experienced lower than expected latency can have their priority reduced, to allow roam events for other sessions to complete more rapidly. In this way, embodiments of the present disclosure increase the probability that any given roam event will be completed within target parameters (e.g., a target maximum latency or delay). By utilizing this dynamic prioritization, network connectivity is improved because fewer roam events exceed the defined maximum delay (which can cause stutter or dropped data), without unduly harming other sessions (e.g., without introducing problematic delay to other sessions which are operating normally). In the present disclosure, roam events are discussed for illustration. However, as understood by one of ordinary skill in the art, embodiments of the present disclosure can be applied across any type of network event.

FIG. 1 illustrates an environment 100 configured to dynamically prioritize roam events, according to one embodiment disclosed herein. As illustrated, Client Devices 105A and 105B interact with a Network 120. In embodiments, the Network 120 may be a wide area network (WAN), a local area network (LAN) or wireless LAN (WLAN) deployment (e.g., a Wi-Fi system), a mobile phone/cellular system, or any other suitable networking system. As illustrated, the Network 120 is conceptually divided into a Data plane 110 and a Control Plane 115. In embodiments, the Data Plane 110 handles forwarding of data (e.g., packets), while the Control Plane 115 manages control functionality, authentication, and the like. In various embodiments, the Control Plane 115 and Data Plane 110 may be implemented across multiple devices (e.g., in a software defined network) or may be configured on each network device. In the illustrated embodiment, one or more components in the Control Plane 115 of the Network 120 interface with one or more remote Servers 125 (e.g., AAA servers, DHCP servers, and the like).

In an embodiment, when a Client Device 105 roams between APs in the Network 120, one or more packets, messages, or events are transmitted from the Client Device 105 to one or more components in the Data Plane 110. If the Client Device 105 is initiating a roam event, in an embodiment, the Data Plane 110 transmits one or more messages (or forwards the received messages) to one or more components in the Control Plane 115 for processing. In the illustrated embodiment, the Control Plane 115 can transmit and receive messages to and from the remote Servers 125 during the roam event. In other embodiments, however, the components in the Control Plane 115 access the Servers 125 through the Data Plane 110. In one embodiment, each time the Data Plane 110 receives a message as part of the roam, it searches a bloom filter bank to determine a priority associated with the roam, and places the message on an appropriate transmit queue, based on this priority. In some embodiments, the Data Plane 110 uses a default priority queue if the session is not found in the filter bank.

Further, in some embodiments, each time the Control Plane 115 receives a message as part of a roam event, the Control Plane 115 determines an elapsed time for the roam, and compares the elapsed time to the expected latency (e.g., based on the number of roam messages that have been transmitted/received, the number of messages that remain to complete the roam, and the like). The Control Plane 115 can then reconfigure the priority of the session based on this elapsed latency (e.g., by instructing the Data Plane 110 to reprogram the bloom filters, by adjusting its own priority queues, and the like). In one embodiment, once the roam is completed, the Data Plane 110 removes the completed flow from the bloom filter bank.

Figure 2A:
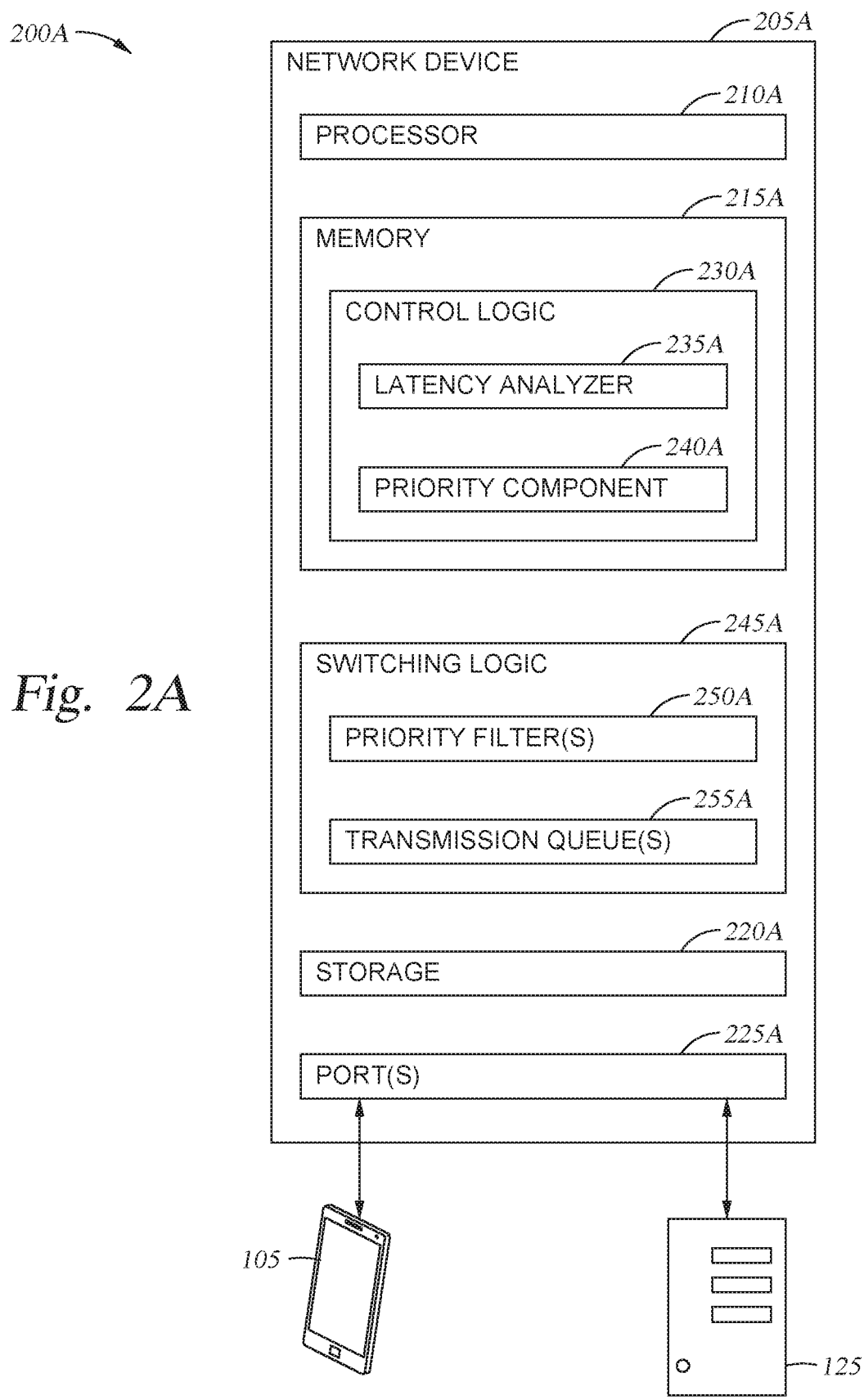
FIG. 2A is a block diagram illustrating a system configured to dynamically prioritize network events, according to one embodiment disclosed herein.

FIG. 2A is a block diagram illustrating a system 200A configured to dynamically prioritize network events, according to one embodiment disclosed herein. In the illustrated embodiment, a Network Device 205A (e.g., a router, switch, access point, gateway, and the like) is connected to both a Client Device 105, as well as a Server 125. In one embodiment, the Network Device 205A is an access point operating in a WLAN deployment. Although a single Client Device 105 is illustrated, there may of course be any number of Client devices 105 connected to the Network Device 205A, and to the broader network deployment the Network Device 205A is a part of. Similarly, although a single Server 125 is illustrated, in embodiments, the Network Device 205A may be communicatively coupled to any number of Servers 125, including AAA servers, DHCP servers, and the like. Additionally, in embodiments, the connection to the remote Server 125 may be through one or more networks (such as the Internet).

As illustrated, the Network Device 205A includes a Processor 210A, a Memory 215A, Switching Logic 245A, Storage 220A, and a set of Ports 225A. In the illustrated embodiment, Processor 210A retrieves and executes programming instructions stored in Memory 215A as well as stores and retrieves application data residing in Storage 220A. Processor 210A is representative of a single CPU, multiple CPUs, a single CPU having multiple processing cores, and the like. Memory 215A is generally included to be representative of a random access memory. Storage 220A may be a disk drive or flash-based storage device, and may include fixed and/or removable storage devices, such as fixed disk drives, removable memory cards, or optical storage, network attached storage (NAS), or storage area-network (SAN). Via the Ports 225A, the Network Device 205A can be communicatively coupled with other devices including other network devices, devices used by administrators to configure the Network Device 205A, remote Servers 125, Client Devices 105, and the like.

In the illustrated embodiment, the Switching Logic 245A is encoded logic used to route packets and data through the data plane of the network. In embodiments, the Switching Logic 245A may be implemented using hardware, software, or a combination of hardware and software. Similarly, in the illustrated embodiment, the Control Logic 230A implements the operations and functionality of the control plane of the network, and may be implemented using hardware, software, or a combination of hardware and software. Although illustrated as residing on a single Network Device 205A, in some embodiments, the data plane and control plane are separated and implemented on multiple discrete devices or components, as discussed in more detail below with respect to FIG. 2B.

As illustrated, the Switching Logic 245A includes a set of one or more Priority Filter(s) 250A, and a set of one or more Transmission Queue(s) 255A. In one embodiment, each Priority Filter 250A corresponds to a respective Transmission Queue 255. In the illustrated embodiment, when a message or transaction relating to an event or session (e.g., a roam event) is received, the Network Device 205A checks each Priority Filter 250A to determine an appropriate priority, and places the received data on the corresponding Transmission Queue 255A. In one embodiment, each Priority Filter 250A is a bloom filter. In embodiments, bloom filters are probabilistic data structures that can be used to determine whether a given element is a member of a set. For example, in one embodiment, the Priority Filters 250A are searched based on the received message or transaction (e.g., using a key that identifies the relevant network session or event for the message). If a match is identified in a Priority Filter 250A, the message is treated with the corresponding priority.

In one embodiment, each bloom filter is a bit array of length k, where k may be defined by an administrator. Additionally, in an embodiment, each bloom filter uses one or more hash functions, which maps input keys to a given position in the array. In some embodiments, in order to add an element to a bloom filter, the key is hashed using each of the one or more hash functions, and each of the corresponding one or more bits in the bit array are set to "one." In order to subsequently query the filter, the key is again hashed using the one or more hash functions, and it is determined whether the identified array positions are "one" or "zero." In one embodiment, if one or more of these bit positions are zero, the Network Device 205A determines that the message does not have a match in the bloom filter. In some embodiments, the Network Device 205A only determines that the session is not present in the Priority Filter 250 if none of the determined bits are one. Thus, in one embodiment, in order to assign a particular priority to a session, the Network Device 205A programs the corresponding Priority Filter 250A using a key that is unique to the session. The key can later be used to search the Priority Filters 250A, in order to identify the corresponding priority.

In an embodiment, because the bloom filters are probabilistic, false positives are possible, but false negatives are not. That is, in an embodiment, if the key is not included in a given Priority Filter 250A, the Switching Logic 245A can conclusively determine that the key is not present. However, it is possible that a key may return a false positive. In embodiments, given a large enough length k and appropriate hash function(s), such collisions (e.g., false positives) are relatively rare. In some embodiments, if a key returns a match in any of the Priority Filters 250A, the Network Device 205A determines to use the highest priority for which a match was identified. For example, if a key finds a match in both the "medium priority" filter and the "low priority" filter, the Network Device 205A will use the medium priority Transmission Queue 255A. In some embodiments, in addition to adding sessions to Priority Filters 250A, the Network Device 205A can also deprogram the filters (e.g., remove sessions) as needed. In one embodiment, removing a session from a Priority Filter 250A includes hashing the associated key to determine the relevant one or more bits in the array, and setting each of these bits to zero.

In the illustrated embodiment, when a transaction, message, or event is received, the Network Device 205A extracts, identifies, or generates a corresponding key for the session the data belongs to. The Network Device 205A then searches the Priority Filters 250A based on the key, and places the message on the corresponding Transmission Queue 255A. In one embodiment, in addition to or instead of utilizing the Transmission Queues 255A, the Network Device 205A also includes processing queues, where the receive transactions await processing by the Network Device 205A. In embodiments, the Transmission Queues 255A are used to temporarily store messages that are to be transmitted, e.g., to the Control Logic 230A, to a Server 125, to a Client Device 105, and the like. In this way, the Switching Logic 245A processes and/or forwards each transaction based on the appropriate priority.

As illustrated, the Control Logic 230A includes a Latency Analyzer 235A and a Priority Component 240A. In embodiments, the Latency Analyzer 235A analyzes the latency or delay associated with each session, and the Priority Component 240A assigns a revised priority to sessions, based on the analyzed latency. In one embodiment, upon receiving data relating to an event (e.g., a message or transaction involved in a roam event), the Latency Analyzer 235A determines whether it is the first such message in the event, or if at least one prior transaction has occurred in the roam. If the received message is the first for the event, in an embodiment, the Latency Analyzer 235A stores an indication of the session or event (e.g., a MAC address of the corresponding Client Device 105), along with a timestamp for the event. In embodiments, the timestamp corresponds to the time at which the event began. In one embodiment, this timestamp is the time at which the message or transaction was originally transmitted. The Latency Analyzer 235A can then determine an elapsed time q for the event, based on the difference between the current time and the timestamp.

If the Latency Analyzer 235A determines that the received message is part of an ongoing event (e.g., at least one message has already been received), the Latency Analyzer 235A similarly identifies the corresponding timestamp associated with the beginning of the event, and compares it to the current time to determine the elapsed time q. In some embodiments, the Latency Analyzer 235A further determines, for each message, an expected elapsed time e for the event, based on a predefined configuration. In one embodiment, the Latency Analyzer 235A knows an expected or average number of transactions n that will occur during the ongoing event, based on a previous configuration. For example, an administrator may define that a "roam" event will require n transactions or messages. In one embodiment, the configuration further specifies the total acceptable latency m for the event.

In such an embodiment, the Latency Analyzer 235A can then determine a completion percentage (e.g., the percentage of such messages that have already occurred or been completed) p, based on identifying the message or transaction that was just received. In an embodiment, the Latency Analyzer 235A can thus determine an expected elapsed time e by multiplying p and n. The Priority Component 240A can then compare this expected time e to the actual elapsed time q, in order to determine an appropriate priority for the session. In one embodiment, the Priority Component 240A determines a magnitude of the difference between the expected time e and the actual time q, and adjusts the priority based on this deficit. For example, if the difference is below a first threshold, the Priority Component 240A may maintain the current priority. If the difference is above the first threshold but below a second, the Priority Component 240A may assign a second, relatively higher priority. Of course, any number of priorities and thresholds may be used in a given embodiment.

In one embodiment, rather than using thresholds, the Priority Component 240A assigns a priority value (e.g., an integer between zero and one hundred) based on the magnitude of the difference. In such an embodiment, each level of priority is associated with a corresponding range of values, and the Priority Component 240A can select the appropriate priority based on the determined value. In some embodiments, in addition to increasing the priority if the deficit between e and q exceeds a threshold, the Priority Component 240A can similarly reduce the priority of a session if there is a surplus (e.g., if the expected time e is longer than the actual time q). In embodiments, the Priority Component 240A can similarly use a series of thresholds and/or an integer value to determine how far the priority should be adjusted downward.

In one embodiment, the predefined configuration used by the Latency Component 235A and/or Priority Component 240A includes a lookup table for each type of event, where each entry in the table indicates the corresponding message or transaction, the expected elapsed time up to that point, and/or a predefined tolerance in latency to determine how many levels the priority should be adjusted. For example, in one embodiment, a lookup table similar to Table 1, below, is used to determine the appropriate level of priority.

TABLE 1

| Message | Expected Time | Tolerance |
| --- | --- | --- |
| EAP PEAP Request | 8.5 milliseconds | +3.5 milliseconds |
| EAP PEAP Response | 24 milliseconds | +4 milliseconds |
| ... | ... | ... |
| $6^{th}$ RADIUS Response | 36 milliseconds | +4 milliseconds |
| ... | ... | ... |
| Last RADIUS Response | 54 milliseconds | +2 milliseconds |

Using Table 1, Control Logic 230A can identify which message or transaction was just received, determine the corresponding expected time, and determine whether the actual elapsed time exceeds the defined tolerance. For example, if the received message is an "EAP PEAP Response," the expected elapsed time is 24 milliseconds. In an embodiment, if the actual elapsed time is 26 milliseconds, the Control Logic 230A will increase the priority of the session by one level, because the actual elapsed time is higher than the expected time, but less than the defined tolerance (e.g., 28 milliseconds). If, however, the actual time is 30 milliseconds, in one embodiment, the Control Logic 230A increases the latency by two or more levels. Of course, any number of such thresholds can be utilized in various embodiments.

In the illustrated embodiment, once the Priority Component 240A has determined the appropriate priority, the Control Logic 230A instructs the Switching Logic 245A to reprogram one or more Priority Filters 250A, based on the revised priority. Thus, in an embodiment, each time a message is received by the Control Logic 230A, the priority of the corresponding session is revised, such that future messages or transactions in the session are processed and transmitted with the appropriate level of priority.

Figure 2B:
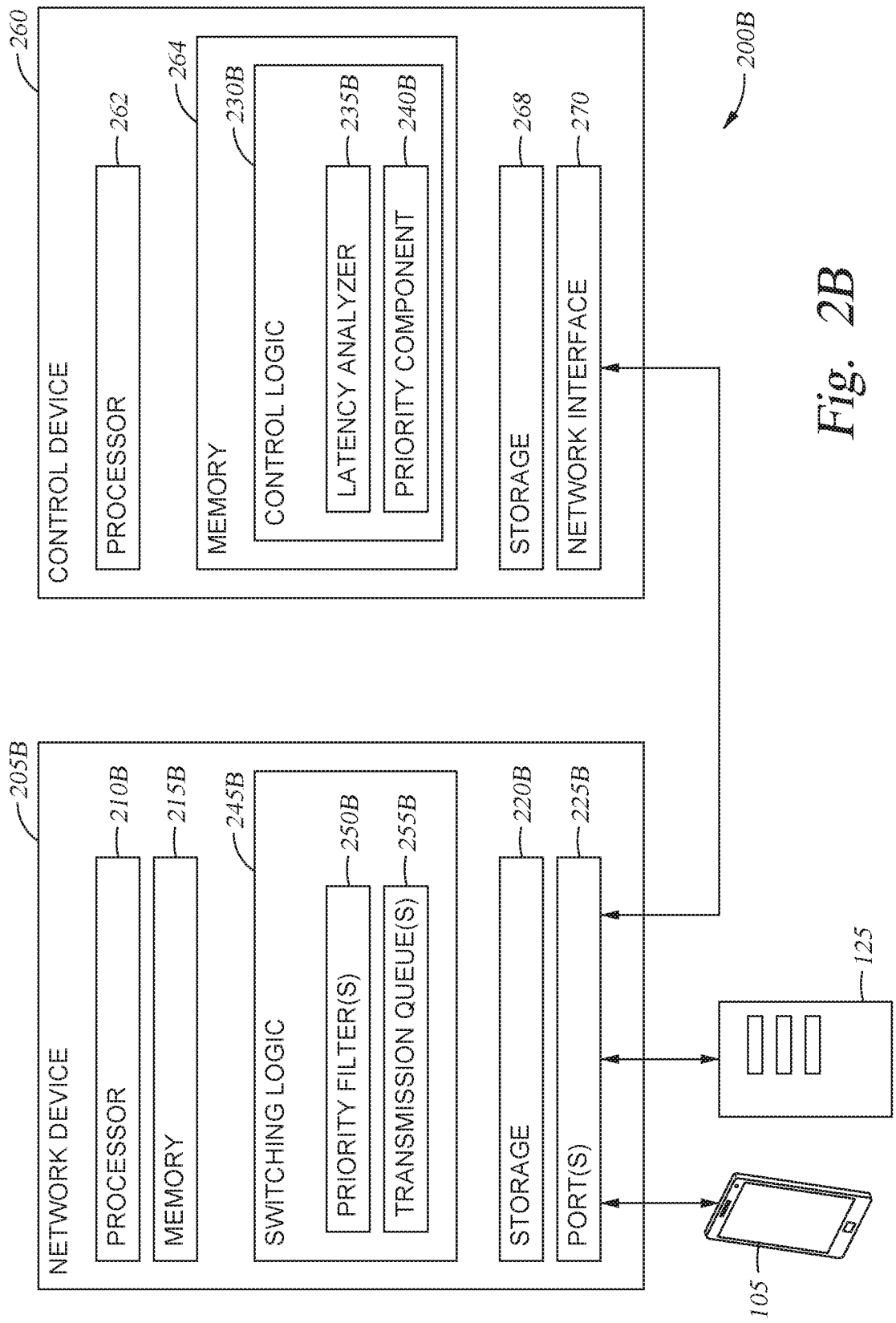
FIG. 2B is a block diagram illustrating a system configured to dynamically prioritize network events, according to one embodiment disclosed herein.

FIG. 2B is a block diagram illustrating a system 200B configured to dynamically prioritize network events, according to one embodiment disclosed herein. In the illustrated embodiment, a Network Device 205B (e.g., a router, switch, access point, gateway, and the like) is connected to a Client Device 105, a Server 125, and a Control Device 260 (e.g., a WLAN controller). In one embodiment, the Network Device 205B is an access point operating in a WLAN deployment. Although a single Client Device 105 is illustrated, there may of course be any number of Client devices 105 connected to the Network Device 205B, and to the broader network deployment the Network Device 205B is a part of. Similarly, although a single Server 125 is illustrated, in embodiments, the Network Device 205B may be communicatively coupled to any number of Servers 125, including AAA servers, DHCP servers, and the like. Further, in embodiments, the Network Device 205B may be connected to the remote Servers 125 via one or more intermediary networks, such as the Internet.

As illustrated, the Network Device 205B includes a Processor 210B, a Memory 215B, Switching Logic 245B, Storage 220B, and a set of Ports 225B. In the illustrated embodiment, Processor 210B retrieves and executes programming instructions stored in Memory 215B as well as stores and retrieves application data residing in Storage 220B. Processor 210B is representative of a single CPU, multiple CPUs, a single CPU having multiple processing cores, and the like. Memory 215B is generally included to be representative of a random access memory. Storage 220B may be a disk drive or flash-based storage device, and may include fixed and/or removable storage devices, such as fixed disk drives, removable memory cards, or optical storage, network attached storage (NAS), or storage area-network (SAN). Via the Ports 225B, the Network Device 205B can be communicatively coupled with other devices including other network devices, devices used by administrators to configure the Network Device 205B, remote Servers 125, Client Devices 105, Control Devices 260, and the like.

In the illustrated embodiment, the Switching Logic 250B is generally configured to perform the same functionality as the Switching Logic 250A, discussed above in reference to FIG. 2A. In the illustrated embodiment, however, the Control Logic 230B is implemented on a separate Control Device 260 (e.g., a WLAN controller). As illustrated, the Control Device 260 includes a Processor 262, a Memory 264, Storage 268, and a Network Interface 270. In the illustrated embodiment, Processor 262 retrieves and executes programming instructions stored in Memory 264 as well as stores and retrieves application data residing in Storage 268. Processor 262 is representative of a single CPU, multiple CPUs, a single CPU having multiple processing cores, and the like. Memory 264 is generally included to be representative of a random access memory. Storage 268 may be a disk drive or flash-based storage device, and may include fixed and/or removable storage devices, such as fixed disk drives, removable memory cards, or optical storage, network attached storage (NAS), or storage area-network (SAN). Via the Network Interface 270, the Control Device 260 can be communicatively coupled with other devices including network devices, devices used by administrators to configure the Control Device 260, remote Servers 125, and the like.

In the illustrated embodiment, the Control Logic 230B is generally configured to perform the same functionality as the Control Logic 230A, discussed above with reference to FIG. 2A. Similarly, the operations and functionality of the Control Logic 230B may be implemented using hardware, software, or a combination of hardware and software. Notably, when the Control Logic 230B is configured on a discrete device apart from the Switching Logic 245B (e.g., the data plane and the control plane are managed on discrete devices), additional network latency can be introduced for messages that must traverse between the control plane and data plane during the roam event. Embodiments of the present disclosure enable the Network Device 205B and/or Control Device 260 to utilize dynamic re-prioritization of network flows in order to obviate or reduce these concerns.

Figure 3:
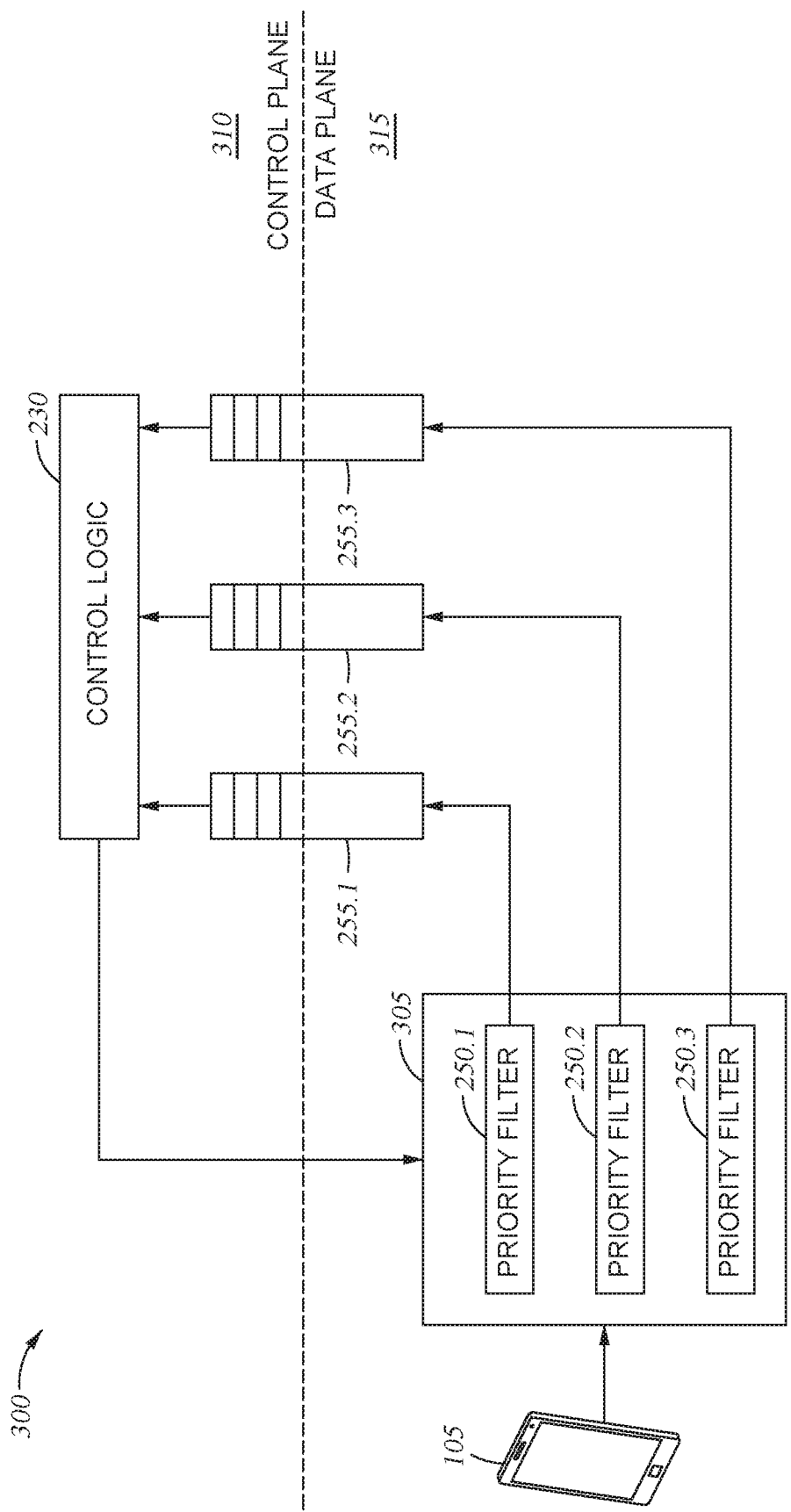
FIG. 3 illustrates a workflow for dynamic prioritization of network events, according to one embodiment disclosed herein.

FIG. 3 illustrates a workflow 300 for dynamic prioritization of network events, according to one embodiment disclosed herein. As illustrated, the network is logically segmented into a Control Plane 310 and a Data Plane 315. In the illustrated embodiment, data (e.g., messages or transactions) are received (e.g., from Client Devices 105, from remote servers, and the like) at a Filter Bank 305 that includes a number of Priority Filters 250.1, 250.2, and 250.3. Although the illustrated Filter Bank 305 includes three Priority Filters 250 (e.g., a low priority filter, a medium priority filter, and a high priority filter), any number of Priority Filters 250 can be included in other embodiments. Further, as illustrated, each Priority Filter 250 is linked to a corresponding Transmission Queue 255, which is used to transfer data from the Data Plane 315 to the Control Plane 310. In some embodiments, the same Transmission Queues 255 (or other similarly configured priority queues) are used to transmit data from the Data Plane 315 to other destinations, including remote Servers 125, Client Devices 105, other access points, and the like.

In some embodiments, there are an equal number of Priority Filters 250 and Transmission Queues 255. In such an embodiment, if a received session is not found in any of the Priority Filters 250 in the Filter Bank 305, it is placed onto a pre-selected Transmission Queue 255 used as a default queue (e.g., the queue with the lowest priority, the medium priority queue, or the high priority queue). In some embodiments, however, there is an additional Transmission Queue 255 used for "default" priority. In such an embodiment, if the session does not match any of the Priority Filters 250, the data is placed onto this default queue.

In some embodiments, as discussed above, each of the Priority Filters 250 is a bloom filter. In one embodiment, when a packet is received (e.g., the first packet in a session or roam event), the Switching Logic 245 identifies or extracts a key from the packet, to be used to search the Bloom Filter Bank 305. In one embodiment, the key is the media access control (MAC) address of the Client Device 105 (e.g., the source MAC specified by the packet, if the packet was received from the Client Device 105, or the destination MAC if it is destined for the Client Device 105). This key is then used to search the Bloom Filter Bank 250 (e.g., by hashing it using the one or more predefined hash functions, and searching each Priority Filter 250 to determine whether the key's hash value(s) is present in each). If a match is found in a Priority Filter 250 (e.g., Priority Filter 250.2), the Switching Logic 245 places the packet on the corresponding Transmission Queue 255 (e.g., Transmission Queue 255.2). If no match is found, the packet is processed at a default priority.

In the illustrated embodiment, the Control Logic 230 receives or de-queues packets from the Transmission Queues 255. As discussed above, in one embodiment, this includes removing packets from each queue in turn. In such an embodiment, the packets waiting in higher priority queues are processed sooner because the higher priority queues are maintained with fewer sessions assigned to them. Thus, at any given time, there will be fewer packets ahead of a packet placed in the high priority queue, as compared to a packet placed on the back of the low priority queue. In some embodiments, packets are more aggressively or rapidly de-queued from the higher priority queues, in order to ensure they are processed more rapidly.

In an embodiment, when the Control Logic 230 receives a packet (e.g., a message or transaction involved in a roam event), the Control Logic 230 determines the amount of latency that has actually elapsed since the event began, as well as an expected amount of latency. In one embodiment, as discussed above, the Control Logic 230 determines the number of packets that are expected to be sent to complete the event, and determines how many such packets have already been sent. Based on this, the Control Logic 230 can determine a completion percentage for the event (e.g., a percentage of the required or expected packets have already been transmitted). By multiplying this completion percentage with the predefined maximum (or expected maximum) latency, the Control Logic 230 can determine whether the session priority should be elevated (e.g., based on whether the actual historical latency exceeds the determined goal or expected latency).

In one embodiment, the Control Logic 230 utilizes predefined configuration tables such as Table 1 to determine the expected latency for each stage of the roam event, and to determine whether the event or session should be prioritized (based on the actual latency experienced up to that point in time). Based on this determination, in the illustrated embodiment, the Control Logic 230 reprograms the Filter Bank 305 (or instructs a component in the Data Plane 315 to reprogram the Filter Bank 305. For example, in an embodiment, the Control Logic 230 can cause the session's key (e.g., the client MAC address) to be deprogrammed from the Priority Filter 250 it is currently assigned to, and programed into the Priority Filter 250 corresponding to the updated or revised priority.

In some embodiments, this process is repeated for each packet received during the event. That is, in an embodiment, the priority of the event or session is revised and updated each time a packet is transmitted as part of the event. In one embodiment, upon determining that the event has completed (e.g., based on determining that the last expected packet has been transmitted), the Control Logic 230 reprograms the Filter Bank 305 to remove the corresponding session key (e.g., the client MAC address).

Figure 4:
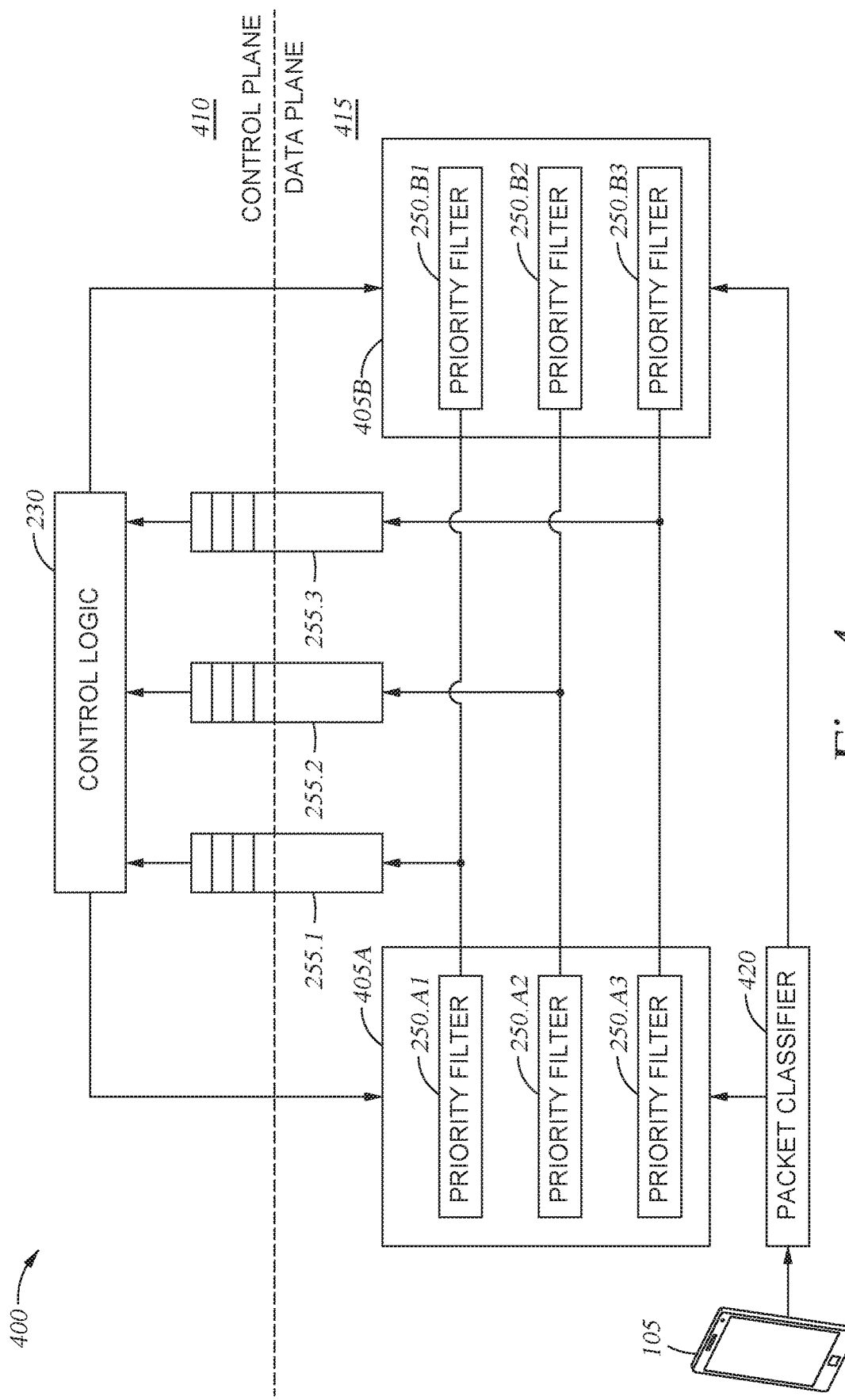
FIG. 4 illustrates a workflow for dynamic prioritization of network traffic having differing characteristics, according to one embodiment disclosed herein.

FIG. 4 illustrates a workflow 400 for dynamic prioritization of network traffic having differing characteristics, according to one embodiment disclosed herein. In the illustrated embodiment, the Data Plan 415 is configured to handle packets that belong to the same session but nevertheless have different keys. For example, the client's MAC address can be used for 802.11 packets, but cannot be used for RADIUS packets. This is because, while the RADIUS request includes the client's MAC address embedded in the "Calling-Station-ID," the RADIUS response does not carry this information. Of course, in embodiments, the workflow 400 can be used to handle any types of packets or data, and is not limited to 802.11 packets and RADIUS packets.

In the illustrated embodiment, the Data Plane 415 includes two Filter Banks 405A and 405б. In an embodiment, the system utilizes a separate Filter Bank 405 for each packet type (or for each type of key). As illustrated, when a packet is received, it is processed by a Packet Classifier 420, which identifies the type of the packet. In an embodiment, each packet type has a predefined type of key, which the Data Plane 415 can use to lookup the session in the appropriate Filter Bank 405A-B. For example, in one embodiment, if the packet is an 802.11 packet, the Packet Classifier 420 extracts the client's MAC address to be used as the key, and sends it to the Filter Bank 405A for lookup. Further, in one embodiment, if the packet is a RADIUS packet, the Packet Classifier 420 extracts both the Controller User Datagram Protocol (UDP) port and the RADIUS Packet Identifier to be used as the corresponding key. This key can then be used to lookup the session in the Filter Bank 405б.

In the illustrated embodiment, the Priority Filters 250.A1 and 250.B1 are associated with the same level of priority, and both add packets to Transmission Queue 255.1. Similarly, the Priority Filters 250.A2 and 250.B2 are associated with the same level of priority, and both add packets to Transmission Queue 255.2. Further, the Priority Filters 250.A3 and 250.B3 are associated with the same level of priority, and both add packets to Transmission Queue 255.3. Of course, any number of Filter Banks 405 and priority levels can be used in various implementations. In one embodiment, when a packet is received, the Packet Classifier 420 determines whether the expected next packet in the session (e.g., the expected response) will be of the same type as the current packet (e.g., whether it will include the same key). If so, the packet can be processed as discussed above. If not, in one embodiment, the Packet Classifier extracts the appropriate key from the packet, and uses it to look up the priority of the session in the appropriate Filter Bank 405 (e.g., Filter Bank 405A). In an embodiment, a second Filter Bank (e.g., Filter Bank 405B) is then programmed with the same priority, using the key of the expected next packet.

For example, suppose the Packet Classifier 420 determines that the received packet is a RADIUS request. In an embodiment, this packet specifies the client MAC address, which can be used as an appropriate key to search the Filter Bank 405A. In one embodiment, the Packet Classifier 420 can further determine, based on a predefined configuration, that the expected next packet for the session (e.g., a RADIUS response) will not include this key (e.g., the client MAC address). Thus, in one embodiment, the Packet Classifier 420 uses the client MAC address to determine the priority for the session. Further, in an embodiment, the Packet Classifier 420 extracts the controller UDP port and RADIUS packet identifier, to be used as the key to look up the session in the Filter Bank 405B. In an embodiment, the Data Plane 415 then programs the Bloom Filter Bank 405б based on the determined key and priority. Further, in the illustrated embodiment, the Control Logic 230 can reprogram both the Filter Banks 405A and 405б based on the historical latency associated with each session, as discussed above. In this way, when the RADIUS response is received, the Data Plane 415 can extract the appropriate key and determine the correct priority.

Figure 5:
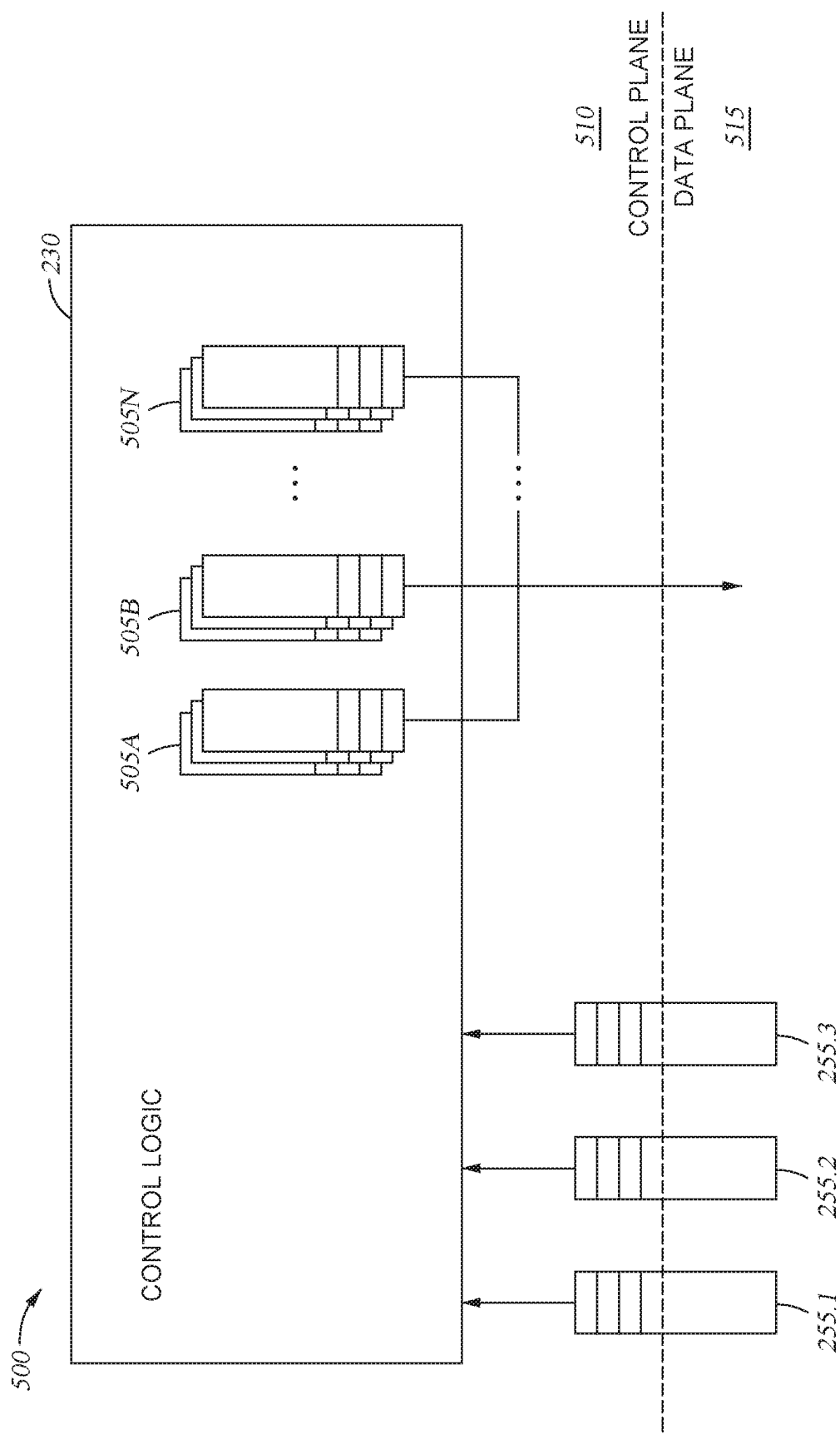
FIG. 5 illustrates a workflow for dynamic prioritization of network events in the control plane, according to one embodiment disclosed herein.

FIG. 5 illustrates a workflow 500 for dynamic prioritization of network events in the control plane, according to one embodiment disclosed herein. In the illustrated embodiment, in addition to or instead of relying on assigned priority and Transmission Queues 255 for data being transmitted from the Data Plane 515 to the Control Plane 510, the Control Logic 230 is further configured to utilize a set of priority queues for its transmissions. In the illustrated embodiment, rather than relying on a single queue for each access point, the Control Logic 245 uses a set of Transmission Queues 505A-N for each access point. That is, in the illustrated embodiment, the Transmission Queues 505A are used to transmit data to a first access point in the deployment, the Transmission Queues 505B are used for a second access point, and so on.

In one embodiment, the Priority Filters 250 and Transmission Queues 255 implemented in the Data Plane 515 are implemented using hardware. In some embodiments, the Transmission Queues 505 present in the Control Plane 510 are implemented using software, as the hardware accelerators present in the Data Plane 515 may be unavailable. In the illustrated embodiment, when the Control Logic 230 reprograms the filter bank(s) used by the Data Plane 515, it also stores an indication of this priority along with the session key(s). When a packet is to be sent, the Control Logic 230 can look up the corresponding priority for the session, and place it on the appropriate queue.

In some embodiments, the Control Plane 510 has additional visibility for each session (e.g., the Control Plane 510 can access additional data), and can determine the packet's priority based on supplementary factors. In one embodiment, the Control Logic 230 further determines the appropriate priority based in part on a type of the packet. For example, messages such as a Pairwise Master Key (PMK) Push message being sent towards an access point can be considered to be decoupled from the other packets in the ongoing roam event (e.g., the other packets or transactions can continue to occur while the PMK Push message is pending). In one embodiment, the Control Logic 230 uses a predefined configuration to determine whether the packet is decoupled from the event, such that it can be transmitted with a default or low priority, regardless of its current latency.

Additionally, in one embodiment, the Control Logic 230 further determines whether the client is using a time-critical application during the roam event, and further determines the appropriate priority based on this determination. For example, in such an embodiment, sessions belonging to a client in the middle of a voice or video stream (e.g., a voice over IP or VOIP chat) can be assigned a relatively higher priority, to ensure the roam is completed prior to the maximum latency. This may be because, for example, any interruption in the voice or video stream is likely to be noticeable to the client, if the roam latency exceeds the defined target. In contrast, applications which are not time-critical or not real-time (e.g., email applications or texting applications) may be better able to handle small delays past the target goal. For example, a roam latency of 75 milliseconds may be imperceptible to an email application, while it would be disruptive to a video stream.

Figure 6:
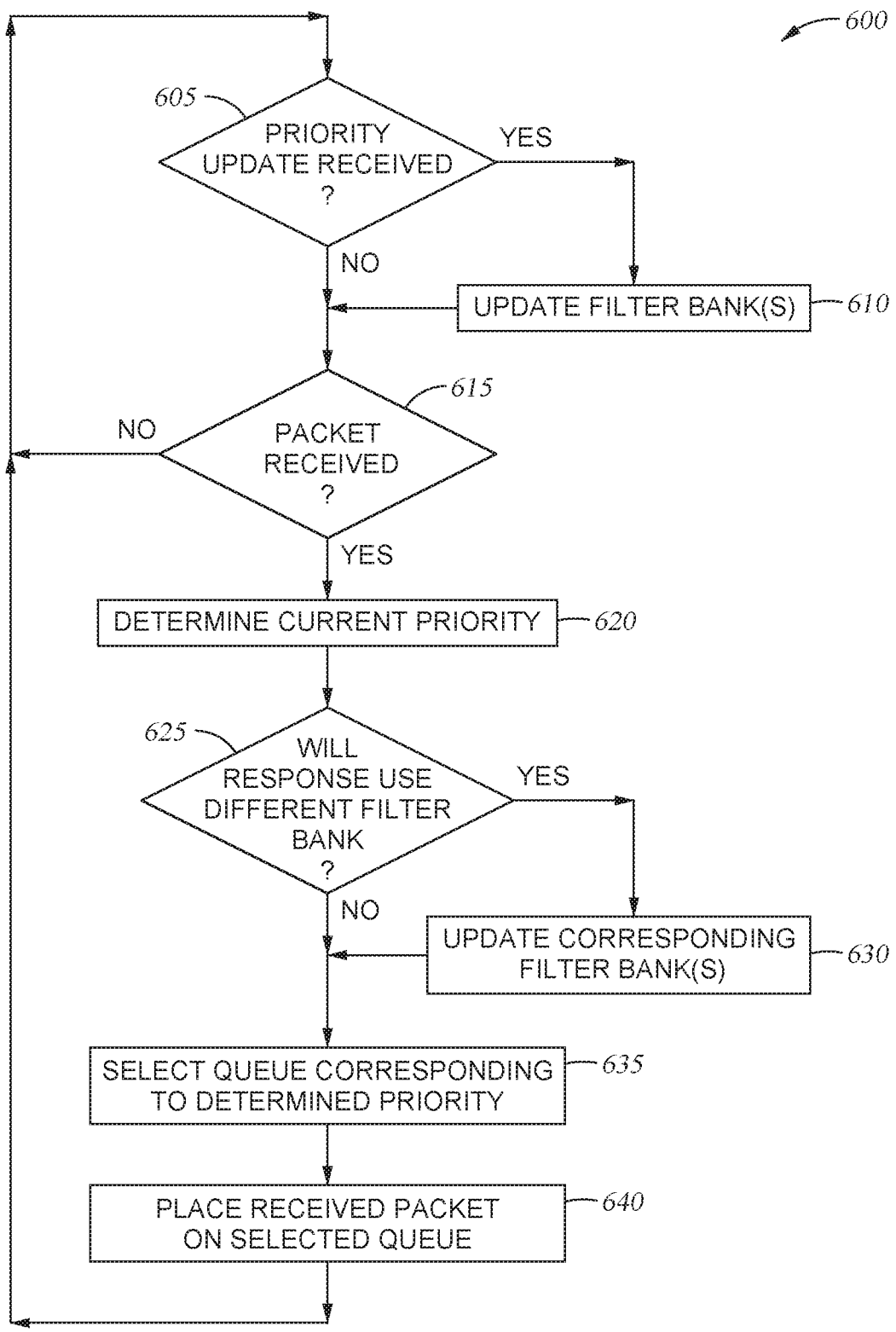
FIG. 6 is a flow diagram illustrating a method for dynamically prioritizing events, according to one embodiment disclosed herein.

FIG. 6 is a flow diagram illustrating a method 600 for dynamically prioritizing events, according to one embodiment disclosed herein. In the illustrated embodiment, the method 600 illustrates the workflow from the perspective of one or more components in the data plane of a network (e.g., switching logic located on an access point). The method 600 begins at block 605, where the Switching Logic 245 determines whether a priority update has been received for any sessions (e.g., from the control plane). In an embodiment, such an update can include, for example, an indication of the updated priority level, an indication of the current priority level, and/or an indication of the session or key. If so, the method 600 proceeds to block 610, where the Switching Logic 245 updates the appropriate filter bank(s). For example, the Switching Logic 245 can determine the key of the session for which priority is being modified, remove the session key from the priority filter where it is currently included, and add the session key to the priority filter associated with the indicated updated priority. Further, in one embodiment, the priority update may indicate that the session should be removed entirely, without programming a new filter (e.g., if the event has completed, or if the session should be moved to the default queue). The method 600 then continues to block 615.

Additionally, if at block 605, the Switching Logic 245 determines that no updated priorities have been received, the method 600 proceeds to block 615. At block 615, Switching Logic 245 determines whether a packet (or other message, transaction, or event) has been received. If not, the method 600 returns to block 605, and loops. If a packet has been received, the method 600 proceeds to block 620, where the Switching Logic 245 identifies the underlying session or event to which the packet belongs, and determines a priority assigned to the session or event. In one embodiment, this includes searching a bank of bloom filters based on a key used to identify the session. If a match is identified in one or more of the filters, the Switching Logic 245 identifies the corresponding priority for the filters. In one embodiment, as discussed above, because the bloom filters are probabilistic, the key may find a match in more than one filter. In such an embodiment, the Switching Logic 245 can determine the priority of each filter which returned a match, and select the highest of these priorities. Additionally, in some embodiments, if no match is found, the Switching Logic 245 utilizes a default priority level.

The method 600 then proceeds to block 625, where the Switching Logic 245 determines whether the next packet or event (e.g., the response) in the event (such as a roam event) will require use of a different bank of filters. For example, if the response will not include the key used by the first filter bank, the Switching Logic 245 can determine that the response must therefore be processed using a second filter bank. If not, (e.g., if the expected next transaction or data is of the same type and/or will include the same key), the method 600 proceeds to block 635. If, however, the Switching Logic 245 determines that the next response will require use of a second filter bank (e.g., the current packet is RADIUS request packet that can use the client's MAC address, and the response will be a RADIUS response that does not include the MAC address), the method 600 proceeds to block 630.

At block 630, the Switching Logic 245 identifies the filter bank(s) that might be required to properly prioritize the response (e.g., identifies the filter bank used for RADIUS packets), and updates the identified bank(s) based on the current priority of the session or event, as specified in the first filter bank (and determined in block 620). In an embodiment, this update process includes programming the appropriate filter in the second filter bank using a second key that can be used to identify the session, where the second key can be extracted from the expected response. The method 600 then continues to block 635.

At block 635, the Switching Logic 245 selects the transmission or processing queue that corresponds to the determined level or priority. That is, in an embodiment, each packet or data unit is first placed onto a queue to await processing or transmission. In embodiments, each queue is associated with a corresponding priority for the data. In the illustrated embodiment, therefore, the Switching Logic 245 determines which queue is associated with the determined priority. Finally, at block 640, the Switching Logic 245 enqueues the packet on the determined queue, where it awaits further processing. The method 600 then returns to block 605, to await further priority updates or packets.

Figure 7:
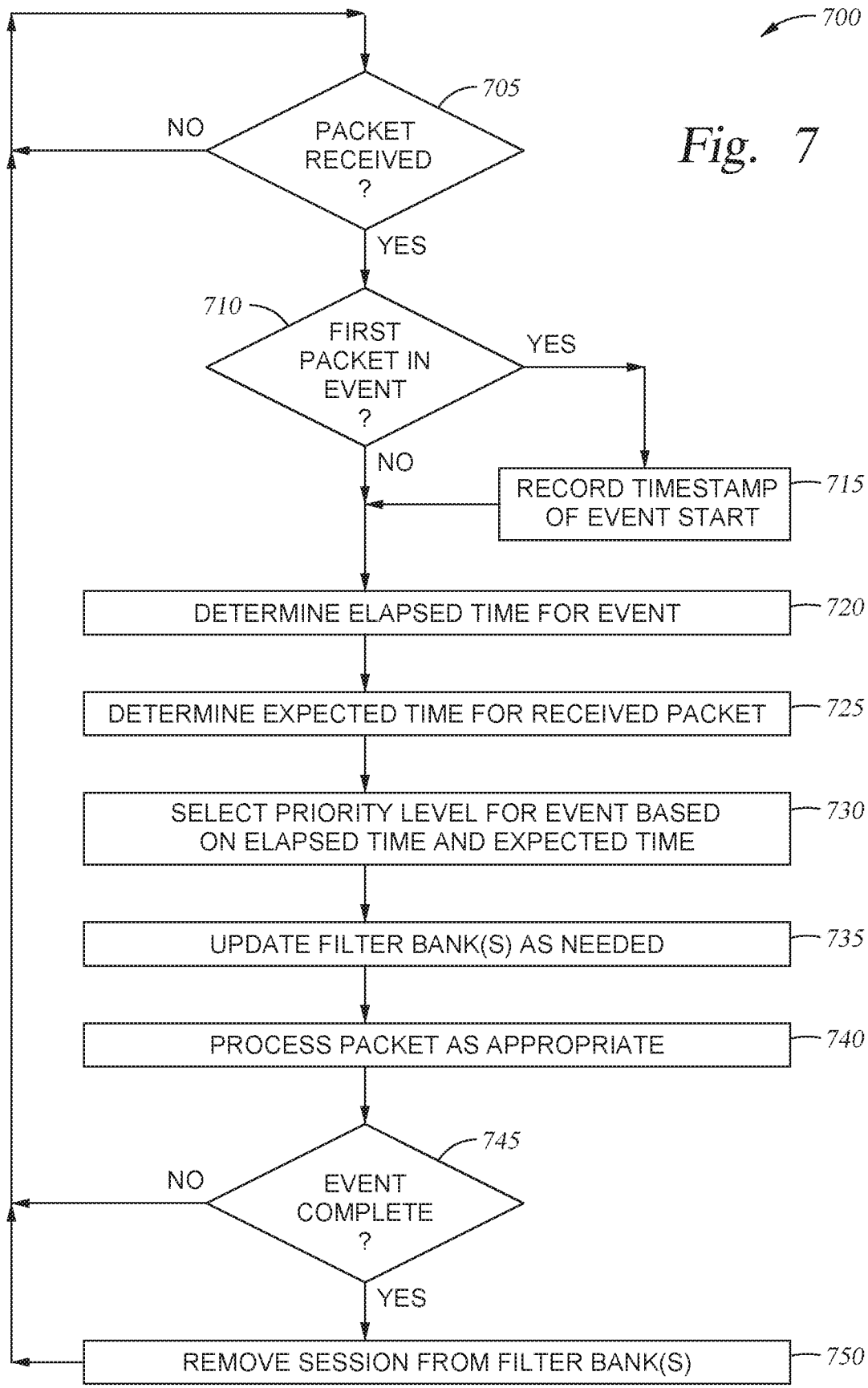
FIG. 7 is a flow diagram illustrating a method for dynamically prioritizing events, according to one embodiment disclosed herein.

FIG. 7 is a flow diagram illustrating a method 700 for dynamically prioritizing events, according to one embodiment disclosed herein. In the illustrated embodiment, the method 700 illustrates the workflow from the perspective of one or more components in the control plane of a network (e.g., the control logic located on an access point or in a WLAN controller such as the Control Device 260). The method 700 begins at block 705, where the Control Logic 230 determines whether a packet has been received. For example, in some embodiments, during a roam event, one or more packets are transmitted to and from the Control Logic 230 from the data plane (e.g., the access point(s), client device, remote servers such as an AAA server or DHCP server, and the like). If no packet has been received, the method 700 loops at block 705.

If, however, the Control Logic 230 determines that a packet has been received, the method 700 proceeds to block 710, where the Control Logic 230 determines whether the received packet is the first packet in an event or session. For example, if the event is a roam event, the Control Logic 230 can determine whether the received packet is the initiation of a roam from a first access point to a second. If so, the method 700 proceeds to block 715, where the Control Logic 230 records the timestamp at which the event began (e.g., the time when the initial packet was transmitted by the client device). The method 700 then proceeds to block 720. Additionally, if at block 710 the Control Logic 230 determines that the packet is not the first one in an event (e.g., that it is part of an ongoing event or session), the method 700 continues to block 720.

At block 720, the Control Logic 230 determines an elapsed time for the ongoing event. In one embodiment, the Control Logic 230 determines, based on the stored records of ongoing sessions or events, the time at which the current event began. The Control Logic 230 can then determine the current time, and compare it to the start time to determine the actual elapsed time for the ongoing event. The method 700 then proceeds to block 725, where the Control Logic 230 determines an expected time for the received packet. As discussed above, in one embodiment, this includes accessing a predefined configuration to determine how many packets are expected to complete the event, as well as how many packets have been seen so far, in order to determine a completion percentage for the ongoing event. In an embodiment, the Control Logic 230 can then multiply the completion percentage by the predefined maximum event time (or expected total event time) to determine an expected elapsed time for the currently received packet.

In another embodiment, the Control Logic 230 accesses a predefined lookup table that indicates the expected elapsed time, given the received packet. For example, such a table may indicate that the first packet should arrive within five milliseconds of the event beginning, the second packet should arrive within twelve milliseconds, and so on. In such an embodiment, the Control Logic 230 can determine which entry in the table the newly received packet corresponds to, and identify the indicated expected time. The method 700 then proceeds to block 730, where the Control Logic 230 selects an appropriate priority level of the ongoing event, based on comparing the elapsed time and the expected time.

For example, in one embodiment, the Control Logic 230 determines a magnitude of the difference between the expected and elapsed times, and compares this magnitude to a series of thresholds used to determine whether to, for example, decrease the priority by two levels, decrease the priority by one level, keep the priority the same, increase the priority by one level, increase the priority by two levels, and so on. In another embodiment, the Control Logic 230 may access the predefined table to determine a tolerance specified by the previously-identified entry. In such an embodiment, the Control Logic 230 can determine whether to change the priority (and how many levels to change the priority) based on this tolerance. In yet another embodiment, the Control Logic 230 computes a new priority score for the session based on a current priority score and based further on the magnitude of the difference between the expected and actual latency. In such an embodiment, the Control Logic 230 can then select the appropriate priority level, based on a predefined mapping between priority scores to discrete priority levels.

The method 700 then proceeds to block 735, where the Control Logic 230 updates the filter bank(s) used by the Switching Logic 245 and/or the filter banks used by the Control Logic 230, as needed. For example, in one embodiment, if the selected priority level is the same as the current priority, the Control Logic 230 does not update any of the filters. The method 700 continues to block 740, where the Control Logic 230 processes the packet as appropriate. For example, in various embodiments, the Control Logic 230 may generate and transmits its own packet (or forward the received packet) to some other device or component, authenticate, analyze, or otherwise process the received packet, and the like. In some embodiments, this processing is based on in part on the determined priority level (e.g., the packet, or a newly generated packet, can be placed on an appropriate processing queue or transmission queue, as determined by the updated priority).

At block 745, the Control Logic 230 determines whether the ongoing event has terminated. That is, in the illustrated embodiment, the Control Logic 230 determines whether the currently received packet is the last expected packet for the event. If not, the method 700 returns to block 705, to await additional packets. If, however, the event has completed (or is in the process of being completed), the method 700 proceeds to block 750, where the Control Logic 230 updates the filter banks of the Switching Logic 245 and/or Control Logic 230 by removing the session or event from the filters. The method 700 then returns to block 705.

Figure 8:
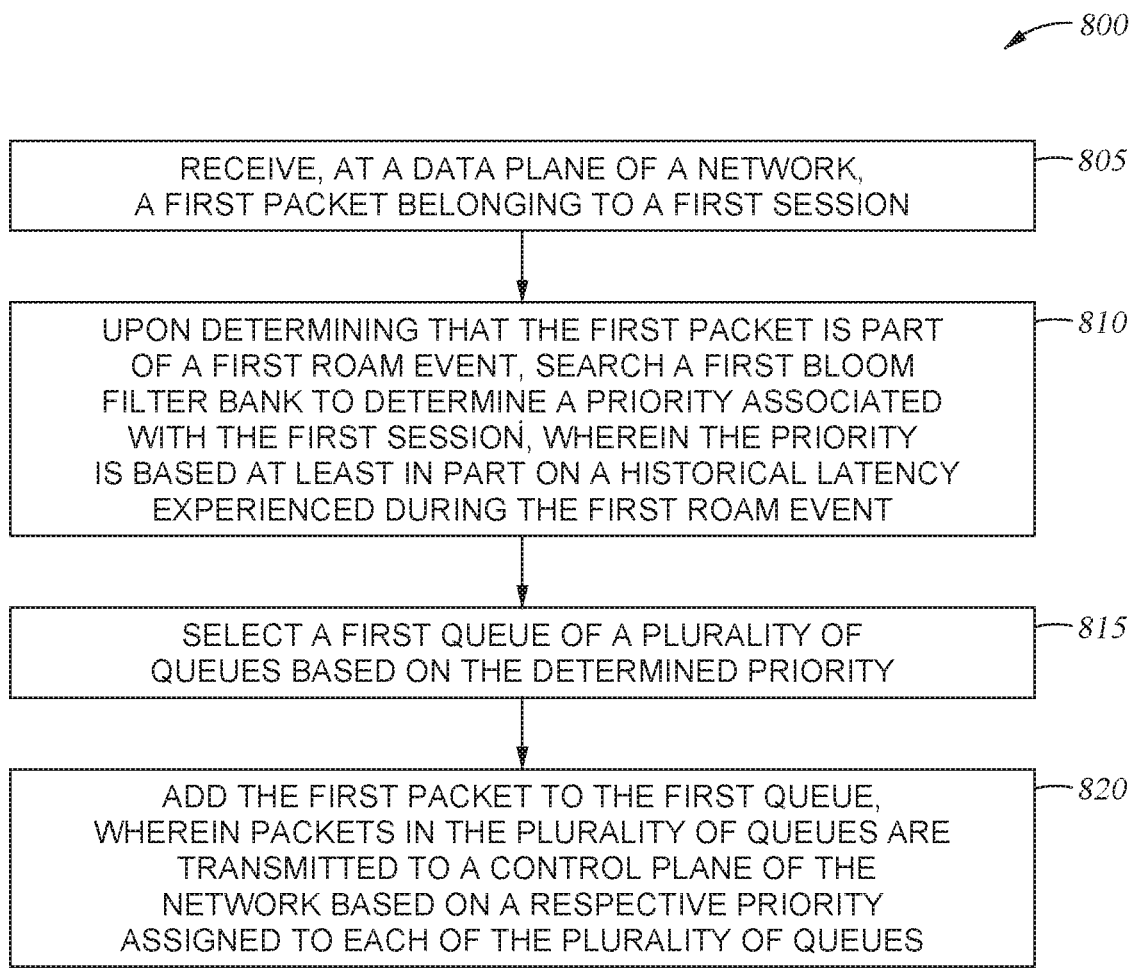
FIG. 8 is a flow diagram illustrating a method for dynamic event prioritization, according to one embodiment disclosed herein.

FIG. 8 is a flow diagram illustrating a method 800 for dynamic event prioritization, according to one embodiment disclosed herein. The method 800 begins at block 805, where a component in a data plane of a network receives a first packet belonging to a first session. At block 810, upon determining that the first packet is part of a first roam event, the data plane component searches a first bloom filter bank to determine a priority associated with the first session, wherein the priority is based at least in part on a historical latency experienced during the first roam event. The method 800 then proceeds to block 815, where the data plane component selects a first queue of a plurality of queues based on the determined priority. Finally, at block 820, the component adds the first packet to the first queue, wherein packets in the plurality of queues are transmitted to a control plane of the network based on a respective priority assigned to each of the plurality of queues.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at a data plane of a network, a first packet belonging to a first session;
   upon determining that the first packet is part of a first roam event, searching a first bloom filter bank to determine a priority associated with the first session, wherein the priority is based on an elapsed time from a start of the first roam event and an expected latency for the first roam event;
   selecting a first queue of a plurality of queues based on the determined priority; and
   adding the first packet to the first queue, wherein packets in the plurality of queues are transmitted to a control plane of the network based on a respective priority assigned to each of the plurality of queues.

2. The method of claim 1, the method further comprising:
   receiving, from the control plane of the network, an updated priority for the first session; and
   updating the first bloom filter bank by associating the first session with the updated priority.

3. The method of claim 2, wherein the updated priority for the first session is a relatively higher priority than a current priority for the first session, and wherein the control plane of the network transmitted the updated priority for the first session upon:
   receiving a second packet belonging to the first session;
   determining an elapsed time between a time when an initial packet belonging to the first roam event was received and a time when the second packet was received; and
   determining that the elapsed time exceeds a predefined threshold.

4. The method of claim 2, wherein the updated priority for the first session is a relatively lower priority than a current priority for the first session, and wherein the control plane of the network transmitted the updated priority for the first session upon:
   receiving a second packet belonging to the first session;

determining an elapsed time between a time when an initial packet belonging to the first roam event was received and a time when the second packet was received; and determining that the elapsed time is below a predefined threshold.

5. The method of claim 1, the method further comprising:

receiving, from the control plane of the network, an indication that the first roam event has completed; and updating the first bloom filter bank by removing an indication of the first session from the first bloom filter bank.

6. The method of claim 1, the method further comprising:

receiving a second packet belonging to a second session;

upon determining that the second packet is part of a second roam event, searching the first bloom filter bank to determine a priority associated with the second session; and upon determining that the first bloom filter bank does not include an indication of the second session, adding the first packet to a default queue of the plurality of queues.

7. The method of claim 1, the method further comprising:

receiving a second packet belonging to a second session, wherein the second packet includes a key that can be used to identify the second session;

upon determining that a response to the second packet will not include the key:

searching a first bloom filter bank based on the key to determine a priority associated with the second session; and updating a second bloom filter bank based on a second key associated with the second session.

8. The method of claim 1, wherein searching the first bloom filter bank comprises:

determining a media access control (MAC) address of a client device associated with the first session; and using the MAC address of the client device as a key to search the first bloom filter bank.

9. The method of claim 1, wherein the first bloom filter bank comprises a plurality of bloom filters, wherein each of the plurality of bloom filters is associated with a respective priority level, and wherein searching the first bloom filter bank to determine the priority associated with the first session comprises:

searching each respective bloom filter of the plurality of bloom filters based on a key associated with the first session; and upon finding a match for the key in at least two of the plurality of bloom filters:

determining a plurality of priorities associated with each of the at least two of the plurality of bloom filters; and associating the first session with a highest priority of the plurality of priorities.

10. A computer product comprising logic encoded in a non-transitory medium, the logic executable by operation of one or more computer processors to perform an operation comprising:

receiving, at a data plane of a network, a first packet belonging to a first session;

upon determining that the first packet is part of a first roam event, searching a first bloom filter bank to determine a priority associated with the first session, wherein the priority is based on an elapsed time from a start of the first roam event and an expected latency for the first roam event;

selecting a first queue of a plurality of queues based on the determined priority; and adding the first packet to the first queue, wherein packets in the plurality of queues are transmitted to a control plane of the network based on a respective priority assigned to each of the plurality of queues.

11. The computer product of claim 10, the operation further comprising:

receiving, from the control plane of the network, an updated priority for the first session, wherein the updated priority for the first session is a relatively higher priority than a current priority for the first session, and wherein the control plane of the network transmitted the updated priority for the first session upon:

receiving a second packet belonging to the first session;

determining an elapsed time between a time when an initial packet belonging to the first roam event was received and a time when the second packet was received; and determining that the elapsed time exceeds a predefined threshold; and updating the first bloom filter bank by associating the first session with the updated priority.

12. The computer product of claim 10, the operation further comprising:

receiving, from the control plane of the network, an updated priority for the first session, wherein the updated priority for the first session is a relatively lower priority than a current priority for the first session, and wherein the control plane of the network transmitted the updated priority for the first session upon:

receiving a second packet belonging to the first session;

determining an elapsed time between a time when an initial packet belonging to the first roam event was received and a time when the second packet was received; and determining that the elapsed time is below a predefined threshold; and updating the first bloom filter bank by associating the first session with the updated priority.

13. The computer product of claim 10, the operation further comprising:

receiving, from the control plane of the network, an indication that the first roam event has completed; and updating the first bloom filter bank by removing an indication of the first session from the first bloom filter bank.

14. The computer product of claim 10, the operation further comprising:

receiving a second packet belonging to a second session, wherein the second packet includes a key that can be used to identify the second session;

upon determining that a response to the second packet will not include the key:

searching a first bloom filter bank based on the key to determine a priority associated with the second session; and updating a second bloom filter bank based on a second key associated with the second session.

15. The computer product of claim 10, wherein the first bloom filter bank comprises a plurality of bloom filters, wherein each of the plurality of bloom filters is associated with a respective priority level, and wherein searching the first bloom filter bank to determine the priority associated with the first session comprises:

searching each respective bloom filter of the plurality of bloom filters based on a key associated with the first session; and upon finding a match for the key in at least two of the plurality of bloom filters:
- determining a plurality of priorities associated with each of the at least two of the plurality of bloom filters; and
- associating the first session with a highest priority of the plurality of priorities.

16. A network device comprising:
one or more computer processors; and
logic encoded in a non-transitory medium, the logic executable by operation of the one or more computer processors to perform an operation comprising:
- receiving, at a data plane of a network, a first packet belonging to a first session;
- upon determining that the first packet is part of a first roam event, searching a first bloom filter bank to determine a priority associated with the first session, wherein the priority is based on an elapsed time from a start of the first roam event and an expected latency for the first roam event;
- selecting a first queue of a plurality of queues based on the determined priority; and
- adding the first packet to the first queue, wherein packets in the plurality of queues are transmitted to a control plane of the network based on a respective priority assigned to each of the plurality of queues.

17. The network device of claim 16, the operation further comprising:
receiving, from the control plane of the network, an updated priority for the first session, wherein the updated priority for the first session is a relatively higher priority than a current priority for the first session, and wherein the control plane of the network transmitted the updated priority for the first session upon:
- receiving a second packet belonging to the first session;
- determining an elapsed time between a time when an initial packet belonging to the first roam event was received and a time when the second packet was received; and
- determining that the elapsed time exceeds a predefined threshold; and updating the first bloom filter bank by associating the first session with the updated priority.

18. The network device of claim 16, the operation further comprising:
receiving, from the control plane of the network, an updated priority for the first session, wherein the updated priority for the first session is a relatively lower priority than a current priority for the first session, and wherein the control plane of the network transmitted the updated priority for the first session upon:
- receiving a second packet belonging to the first session;
- determining an elapsed time between a time when an initial packet belonging to the first roam event was received and a time when the second packet was received; and
- determining that the elapsed time is below a predefined threshold; and updating the first bloom filter bank by associating the first session with the updated priority.

19. The network device of claim 16, the operation further comprising:
receiving a second packet belonging to a second session, wherein the second packet includes a key that can be used to identify the second session;
upon determining that a response to the second packet will not include the key:
- searching a first bloom filter bank based on the key to determine a priority associated with the second session; and
- updating a second bloom filter bank based on a second key associated with the second session.

20. The network device of claim 16, wherein the first bloom filter bank comprises a plurality of bloom filters, wherein each of the plurality of bloom filters is associated with a respective priority level, and wherein searching the first bloom filter bank to determine the priority associated with the first session comprises:
searching each respective bloom filter of the plurality of bloom filters based on a key associated with the first session; and
upon finding a match for the key in at least two of the plurality of bloom filters:
- determining a plurality of priorities associated with each of the at least two of the plurality of bloom filters; and
- associating the first session with a highest priority of the plurality of priorities.

* * * * *